United States Patent
Veen et al.

(10) Patent No.: US 10,485,243 B2
(45) Date of Patent: Nov. 26, 2019

(54) WING-CUTTING APPARATUS AND METHOD FOR SEVERING WINGS OR WING PARTS

(71) Applicant: LINCO FOOD SYSTEMS A/S, Trige (DK)

(72) Inventors: Tim Andries Veen, Arnhem (NL); Johannes Cornelis Gerritsen, Doetinchem (NL); Rudi Theodorus Maria Polman, Doesburg (NL)

(73) Assignee: LINCO FOOD SYSTEMS A/S, Trige (DK)

( * ) Notice: Subject to any disclaimer, the term of this patent is extended or adjusted under 35 U.S.C. 154(b) by 0 days.

(21) Appl. No.: 15/776,010

(22) PCT Filed: Feb. 8, 2017

(86) PCT No.: PCT/EP2017/052727
§ 371 (c)(1),
(2) Date: May 14, 2018

(87) PCT Pub. No.: WO2017/137426
PCT Pub. Date: Aug. 17, 2017

(65) Prior Publication Data
US 2018/0325130 A1    Nov. 15, 2018

(30) Foreign Application Priority Data
Feb. 12, 2016 (EP) .................................. 16155538

(51) Int. Cl.
A22C 21/00    (2006.01)

(52) U.S. Cl.
CPC ........ *A22C 21/0023* (2013.01); *A22C 21/003* (2013.01)

(58) Field of Classification Search
CPC .. A22C 21/00; A22C 21/0023; A22C 21/0084
(Continued)

(56) References Cited

U.S. PATENT DOCUMENTS

| 4,669,148 A | 6/1987 | Scheier |
| 4,715,092 A | 12/1987 | Lerner et al. |

(Continued)

FOREIGN PATENT DOCUMENTS

| EP | 0 312 881 | 4/1989 |
| WO | 92/07470 | 5/1992 |

OTHER PUBLICATIONS

English Translation of Int'l Written Opinion conducted in Int'l Application No. PCT/EP2017/052727 (Mar. 8, 2017).

*Primary Examiner* — Richard T Price, Jr.
(74) *Attorney, Agent, or Firm* — Greenblum & Bernstein, P.L.C.

(57) ABSTRACT

Wing cutting apparatus for processing poultry carcasses includes a conveying device configured to convey a poultry carcass along a conveying line in transport direction. First and second separating devices are configured to separate wings or wing parts in pairs from one each of the poultry carcasses. The second separating device is offset from said first separating device. A plurality of concurrent pushing elements are configured to run along in the transport direction. At least one of the pushing elements is arranged to be in association with a carrier element and is configured to come into engagement with the wing or wing parts.

30 Claims, 4 Drawing Sheets

(58) Field of Classification Search
USPC ........ 452/135, 136, 149–155, 166, 169, 170
See application file for complete search history.

(56) References Cited

U.S. PATENT DOCUMENTS

| | | | | |
|---|---|---|---|---|
| 4,920,610 | A | | 5/1990 | Callsen et al. |
| 5,429,549 | A | * | 7/1995 | Verrijp ............... A22C 21/0023 452/154 |
| 5,618,230 | A | * | 4/1997 | Bargele ............. A22C 21/0023 452/165 |
| 5,954,574 | A | * | 9/1999 | Verrijp ............... A22C 21/0023 452/169 |
| 5,984,770 | A | * | 11/1999 | Asano ................ A22C 21/0053 452/165 |
| 6,007,416 | A | * | 12/1999 | Janssen ................ A22C 21/003 452/135 |
| 6,277,020 | B1 | * | 8/2001 | Stephens ............ A22C 21/0023 452/135 |
| 6,322,438 | B1 | * | 11/2001 | Barendregt ........ A22C 21/0023 452/155 |
| 7,335,095 | B2 | * | 2/2008 | Sekiguchi .......... A22C 21/0023 452/169 |
| 7,341,505 | B1 | * | 3/2008 | Gasbarro ........... A22C 21/0023 452/169 |
| 2003/0045223 | A1 | | 3/2003 | Haley et al. |
| 2009/0170417 | A1 | * | 7/2009 | Janssen ............... A22C 21/0023 452/136 |

* cited by examiner

WING-CUTTING APPARATUS AND METHOD FOR SEVERING WINGS OR WING PARTS

CROSS-REFERENCE TO RELATED APPLICATIONS

The present application is a US National Stage Application of International Application No. PCT/EP2017/052727 filed May 14, 2018 which published as WO 2017/137426 on Aug. 17, 2017. This application also claims the right of priority granted under 35 U.S.C. §§ 119 and 365 of European Application No. 16155538.8 filed on Feb. 12, 2016.

BACKGROUND OF THE INVENTION

1. Field of the Invention

The present invention relates to a wing cutting apparatus for processing poultry carcasses, comprising a conveying device configured to convey the poultry carcasses along a conveying line in a transport direction, and a first separating device and a second separating device which are designed to separate wings or wing parts in pairs from one each of the poultry carcasses.

The invention relates further to a method for separating wings or wing parts from poultry carcasses, comprising the steps of conveying the poultry carcasses along a conveying line in transport direction by way of a conveying device and separating the wings or wing parts in pairs from one of the poultry carcasses.

2. Discussion of Background Information

Such a wing cutting apparatus is known, for example, from document WO 92/07470 A1. The wings or wing parts are brought into a cutting position by way of wing holders and cut on both sides simultaneously by means of rotating blades.

A disadvantage is, on the one hand, that the outlay in terms of apparatus for holding and positioning the wings or wing parts to be separated is high. On the other hand, the positions of blades and wing holders are in each case fixed, so that different poultry body anatomies are not taken into account when separating the wings or wing parts. This leads to imprecise and unreliable cutting.

SUMMARY OF THE INVENTION

Accordingly, an object of the present invention is to propose a wing cutting apparatus of the type mentioned hereinbefore which, with minimal structural complexity, allows the wings or wing parts to be separated precisely. A further object is to propose a corresponding method.

The object is achieved by an arrangement having the features mentioned hereinbefore in that the first separating device and the second separating device are arranged offset along the conveying line in the transport direction, in such a manner that the wings or wing parts of a pair are each separated in succession. In other words, the first separating device and the second separating device are arranged spaced apart from one another in the transport direction.

The distance between the first and second separating devices is preferably so chosen that separation of one of the wings or wing parts by way of the first separating device is already complete before the second separating device comes into engagement with the wing or wing parts still remaining on the poultry carcass for separation thereof. In other words, the wing cutting apparatus according to the invention is designed and configured for the sequential separation of the pairs of wings or wing parts. This offers the advantage that the poultry carcasses are in each case in engagement on only one side with one of the separating devices during the separating operation. The poultry carcass is consequently not fixed on both sides during separation but is movable to a certain extent. Precise cutting is thus ensured, regardless of the size of the poultry carcasses.

An expedient embodiment of the invention is characterised in that the conveying device comprises carrier elements for conveying and holding the poultry carcasses, the carrier elements being so configured that the poultry carcasses are mounted to be deflectable at least substantially transversely to the transport direction. This offers the advantage that the poultry carcasses are able to deflect transversely to the transport direction to a certain extent in the transverse direction—depending on the size of the poultry carcass. This represents an important advantage over the wing cutting devices known from the prior art, in which deflection of the poultry carcass transversely to the transport direction is ruled out because the wings or wing parts are fixed on both sides simultaneously. Deflection in the transverse direction has the effect that the wing or wing part to be separated is in each case separated optimally in the first separating device, or in the second separating device, since the wings or wing parts can be positioned optimally for the separating cut because the poultry carcass is mounted without restricted guidance in the transverse direction.

The carrier elements are particularly preferably so configured that the poultry carcasses are conveyed in the transport direction in the carrier elements but are mounted to be movable at least in the transverse direction transversely to the transport direction. Further preferably, the carrier elements themselves are so configured that they are mounted to be displaceable transversely to the transport direction. Deflection of the poultry carcasses transversely to the transport direction is in this case achieved by a transverse displacement of the carrier elements themselves.

A preferred further development of the invention is distinguished in that the conveying device is in the form of an overhead conveyor for receiving the poultry carcasses suspended by their legs by way of the carrier elements. This offers the advantage, on the one hand, that the wing cutting apparatus according to the invention is so configured that it can be integrated directly into a poultry processing plant having an overhead conveyor system. In addition, overhead conveying offers the advantage that the poultry carcasses, because they are suspended from the carrier elements, are movable transversely or substantially transversely to the transport direction and, as described above, are therefore mounted to be correspondingly deflectable.

According to a further preferred embodiment of the invention, the first separating device and the second separating device comprise guiding devices, each of the guiding devices having a guiding gap extending parallel to the transport direction, and are configured to hold the wings or wing parts in one of the guiding gaps and guide them at least substantially parallel to the transport direction. The guiding devices ensure that the wings or wing parts to be separated are precisely aligned and positioned. In this manner, they are guided into an optional position for separation of the wings or wing parts during the continuous transportation of the poultry carcasses.

A further expedient embodiment of the invention is characterised in that the guiding gaps taper in the transport direction. The tapered guiding gaps have the effect that the wings or wing parts are displaced in the respective guiding gaps in such a manner that the joint region between the wing parts to be separated is aligned in the respective guiding gap. In other words, the guiding devices are thus so designed that they automatically "seek" the optimum separating point for the subsequent separating cut and thus precisely align and position the wing or wing parts to be separated.

According to a further preferred embodiment, a threading device is arranged upstream of each guiding device, which threading device is configured to thread the wing or wing part into the guiding gap. By way of the threading device, the wings or wing parts to be separated are fed to the guiding devices.

A further expedient embodiment of the invention is characterised in that a cutting device is arranged downstream of each guiding device, the cutting device being configured to separate the wing or wing part. In this manner, the separating cuts mentioned hereinbefore are carried out with high precision. By way of the guiding devices, the wing or wing part to be separated is positioned and aligned exactly, owing to the transversely deflectable mounting of the poultry carcasses, so that the subsequent separating cut by way of the cutting device has the desired high precision. Anatomical differences between the poultry carcasses thus do not affect the precision of the separating cuts.

According to a further preferred embodiment of the invention, the cutting device are arranged to be stationary. This allows cutting device which are structurally as simple as possible to be used, which do not require much maintenance, meet hygiene requirements because they are easy to clean and, because they are structurally simple, are inexpensive.

An expedient embodiment of the invention is characterised in that each of the cutting device comprises two cutting edges forming a cutting gap, which cutting edges are configured to separate the wing or wing part. The cutting device thus perform a dual function. By way of the cutting edges, the wings or wing parts to be separated are positioned optimally and then separated.

A preferred further development of the invention is distinguished in that the cutting device are so arranged that a cutting plane formed by the cutting edges and the cutting gap is arranged inclined relative to the horizontal. In this manner, the cutting device are optimally adapted to the position assumed by the wings or wing parts of the poultry carcasses during conveying. On the one hand, this prevents parts of the poultry carcasses or of the wings or wing parts from colliding undesirably with the wing cutting apparatus according to the invention. On the other hand, the wing cutting device according to the invention is optimally adapted to the anatomical characteristics of the poultry carcasses that are to be processed.

According to a further preferred embodiment of the invention, it comprises a plurality of concurrent pushing elements which run along in the transport direction each in association with one of the carrier elements and are configured to come into engagement with the wing or wing parts. The pushing elements support the mentioned regions in the transport direction and contribute towards exact positioning during the separating operation.

A further expedient embodiment of the invention is characterised in that the pushing elements are further configured to come into engagement with the poultry carcass in a shoulder region. By additionally supporting the shoulder region, the side of the poultry carcass on which the wings or wing parts are separated is supported. In other words, the respective side of the poultry body is additionally fixed relative to the pushing element and the carrier element during conveying in the transport direction.

According to a further preferred embodiment, the pushing elements are each in the form of a U-shaped profile and each comprise a shoulder region pushing piece and a wing region pushing piece with a pushing piece recess located therebetween. The pushing elements are thus in the form of a particularly compact and simple structural unit. Preferably, the pushing elements are further each in one piece.

A further expedient embodiment of the invention is characterised in that the pushing elements are so arranged transversely to the transport direction that at least one of the guiding devices is arranged at least partially in the pushing piece recess. Optimal guiding of the wing or wing parts to be separated is achieved in this manner.

According to a further preferred embodiment of the invention, the pushing elements are driven by way of at least one drive unit for moving the pushing elements in the transport direction. By way of the drive unit, the pushing elements are actively moved in the transport direction in order actively to support the mentioned regions of the poultry carcass, or of the wings or wing parts, in the transport direction.

An expedient embodiment of the invention is characterised in that the drive speed of the drive unit is configured to be variably adjustable in such a manner that each of the pushing elements is configured to be in advance of or to lag behind the associated carrier element at least temporarily. This offers the advantage that the supporting force by way of which the pushing elements support the above-mentioned regions of the poultry carcass, or of the wings or wing parts, is configured to be variably adjustable.

The object is also achieved by a method having the features mentioned hereinbefore in that the wings or wing parts of a pair are each separated in succession by way of a first separating device and a second separating device. The time difference between the separation of the wings or wing parts by way of the first and second separating devices is therefore preferably so chosen that the separation of one of the wings or wing parts is already complete before separation of the wing or wing parts remaining on the poultry carcass. This offers the advantage that the poultry carcasses are fixed during the separating operation on only one side, namely with the wing or wing part that is in engagement with one of the first separating device or the second separating device. The poultry carcass is consequently not fixed on both sides during the separation but is configured to be movable to a certain extent. Precise cutting—regardless of the size of the poultry carcasses—is thus ensured at all times.

A preferred further development of the invention is distinguished in that the poultry carcasses are held and conveyed by way of carrier elements in such a manner that the poultry carcasses are each mounted to be deflectable at least transversely to the transport direction. This offers the advantage that the poultry carcasses are not rigidly fixed transversely to the transport direction but are able to deflect in the transverse direction to a certain extent—depending on the size of the poultry carcass. This represents an important advantage over the wing cutting devices known from the prior art, in which deflection of the poultry carcass transversely to the transport direction is ruled out because the wings or wing parts are fixed on both sides. Deflection in the transverse direction has the effect that the wing or wing part to be separated is in each case separated optimally in the first separating device, or the second separating device, since the wings or wing parts can be positioned optimally for a precise separating cut because the poultry carcass is mounted without restricted guidance in the transverse direction.

According to a further preferred embodiment of the invention, the poultry carcasses are conveyed suspended by their legs by way of the carrier elements. The method according to the invention can thus easily be integrated into poultry processing systems with overhead conveying. In addition, overhead conveying offers the advantage that the poultry carcasses, because they are suspended from the carrier elements, are movable transversely or substantially transversely to the transport direction and, as described above, are therefore mounted to be correspondingly deflectable.

Further advantageous embodiments of the method according to the invention will be described in the following. The advantages arising therefrom have already been described comprehensively above in connection with the wing cutting apparatus according to the invention. Therefore, in order to avoid repetition, explicit reference is made to the advantages mentioned there also in connection with the advantageous embodiments described in the following.

A further expedient embodiment of the invention is characterised by parallel guiding of the wings or wing parts by way of guiding devices which each have guiding gaps extending parallel to the transport direction.

According to a further preferred embodiment, the method according to the invention comprises threading the wings or wing parts into the respective guiding gap by of a threading device.

A further expedient embodiment of the invention is characterised in that the wings or wing parts are separated by way of cutting device arranged downstream of the guiding devices.

According to a further preferred embodiment of the invention, the separation is carried out by of cutting device which are arranged to be stationary.

An expedient embodiment of the invention is characterised in that the wings or wing parts are guided into a cutting gap formed by way of two cutting edges for separation thereof.

A preferred further development of the invention is distinguished in that the separation takes place by cutting in a cutting plane which is formed by the cutting edges and the cutting gap and which is inclined relative to the horizontal.

According to a further preferred embodiment of the invention, a plurality of concurrent pushing elements are each associated with in each case one of the carrier elements and run along in the transport direction in engagement with one of the wings wing parts.

A further expedient embodiment of the invention is characterised in that the carrier elements each come into engagement with the poultry carcass with a shoulder region.

According to a further preferred embodiment, the pushing elements are driven for movement in the transport direction by way of a drive unit.

A further expedient embodiment of the invention is characterised by at least temporary variation of the drive speed of the drive unit, so that each of the pushing elements is in advance of or lags behind the associated carrier element at least temporarily.

The object is further achieved by a corresponding method having the features mentioned hereinbefore in that the wings or wing parts of a pair are each separated in succession by way of a first separating device and a second separating device.

BRIEF DESCRIPTION OF THE DRAWINGS

Further preferred and/or expedient features and embodiments of the invention will become apparent from the dependent claims and the description. Particularly preferred embodiments will be explained in greater detail with reference to the accompanying drawing, in which:

DETAILED DESCRIPTION OF THE INVENTION

The wing cutting apparatus according to the invention will be described in the following with reference to FIGS. 1 to 4. The following embodiments also serve to illustrate the method according to the invention.

Figure 1:
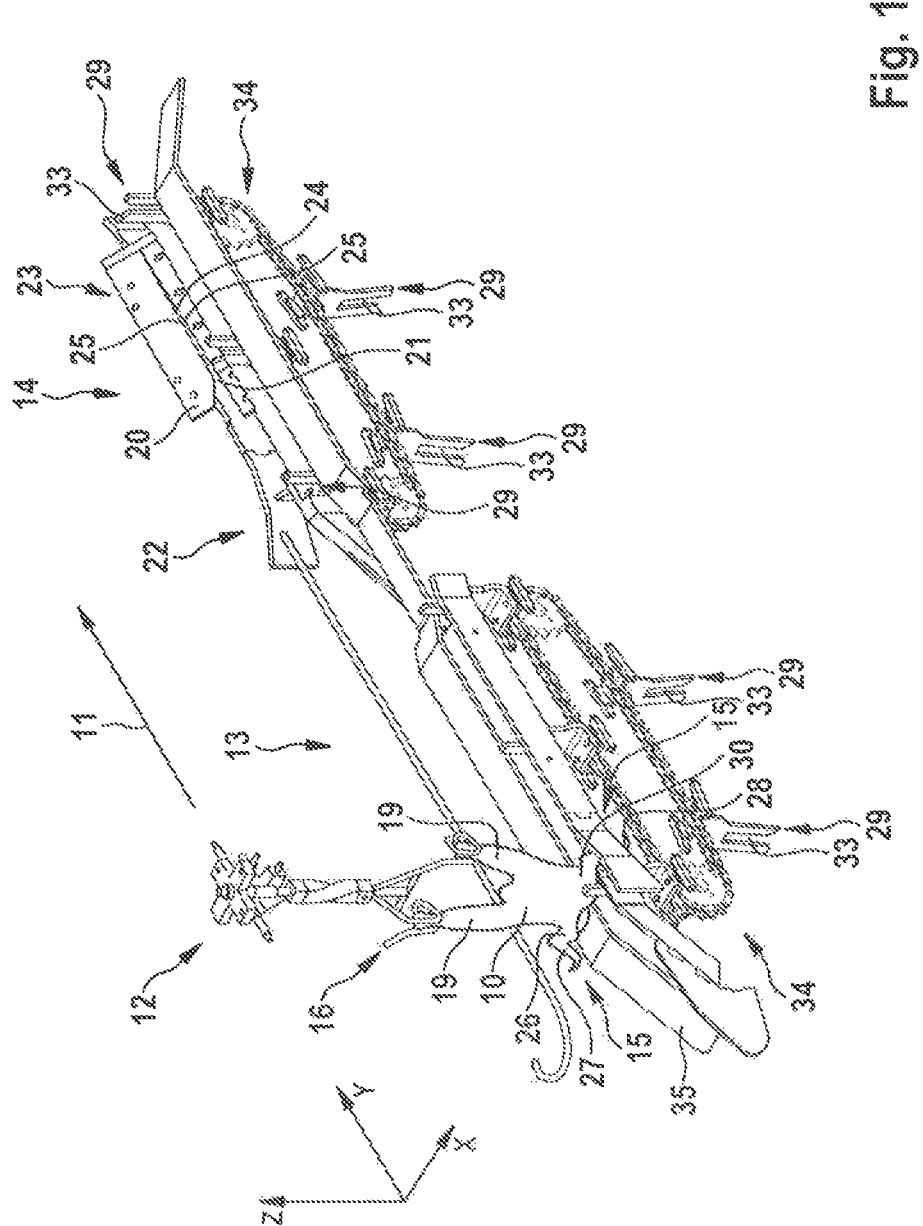
FIG. 1 is a first perspective view of the wing cutting apparatus according to the invention.

FIG. 1 shows a first perspective view of the wing cutting apparatus according to the invention. The wing cutting apparatus is configured and designed to process poultry carcasses 10, of which only one is shown in each of the figures for the sake of clarity. The poultry carcasses 10 are conveyed along a conveying line in a transport direction 11 by way of a conveying device 12. The conveying device 12 is indicated only schematically in the drawing.

Figure 2:
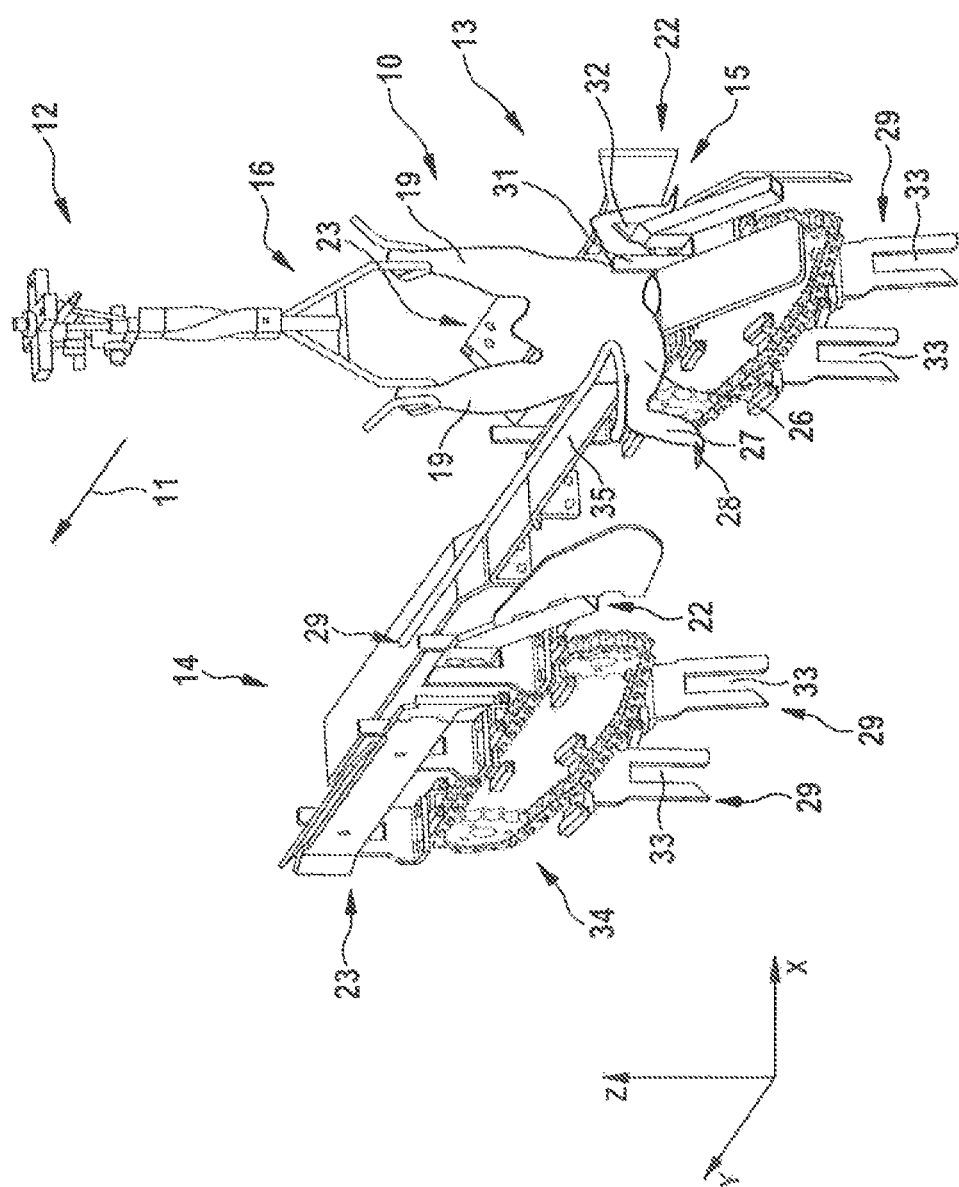
FIG. 2 is a second perspective view of the wing cutting apparatus according to the invention.
Figure 3:
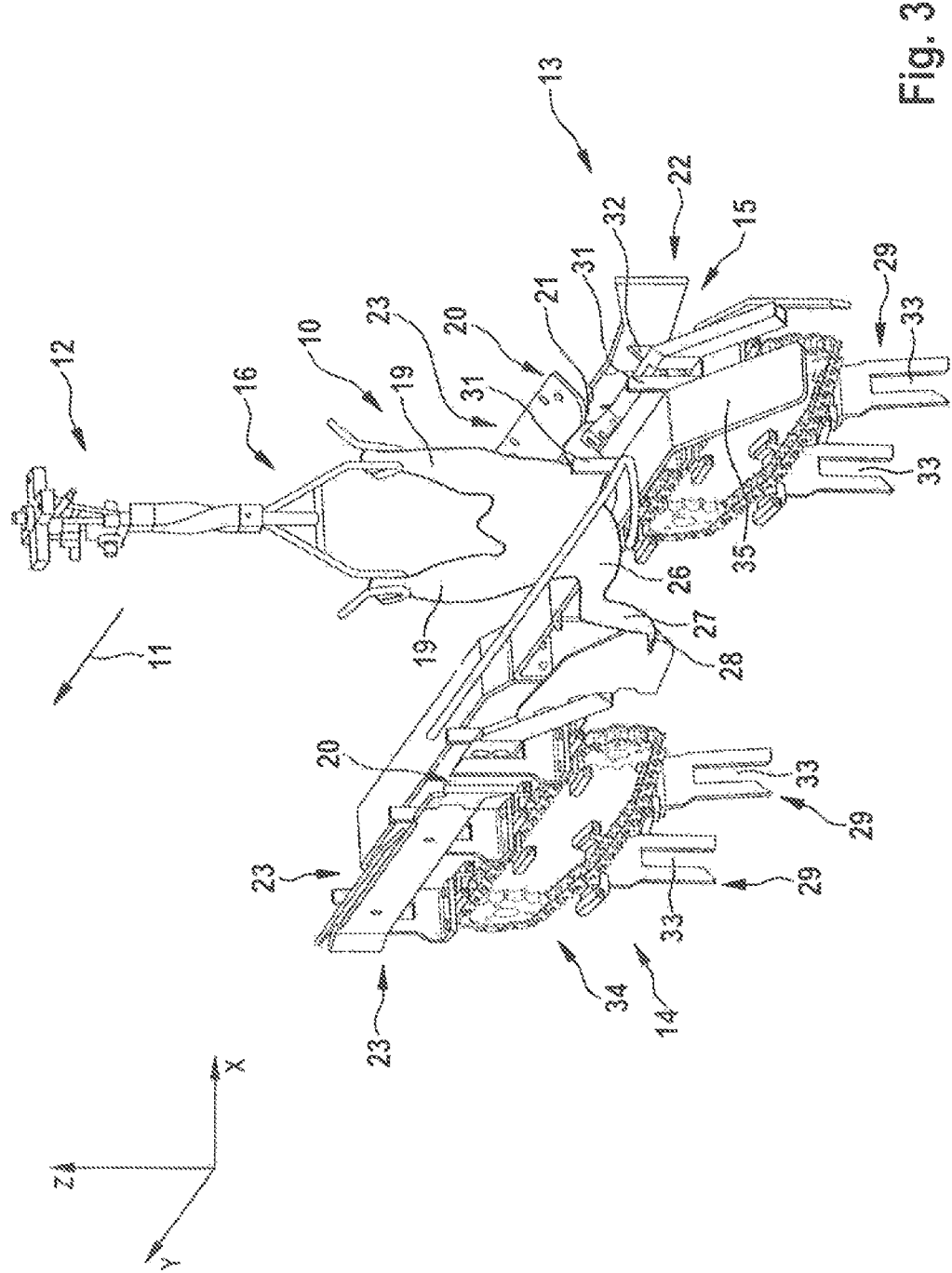
FIG. 3 is a third perspective view of the wing cutting apparatus according to the invention.

FIGS. 1 and 2 each show the poultry carcass 10 in a first position, while the poultry carcass 10 in FIG. 3 is shown in a second position, after the poultry carcass 10 has been conveyed further in the transport direction.

The wing cutting apparatus according to the invention comprises a first separating device 13 and a second separating device 14. The separating devices 13, 14 are designed to separate wings or wing parts 15 in pairs from one of the poultry carcasses 10. The first separating device 13 and the second separating device 14 are arranged offset along the conveying line in such a manner that the wings or wing parts 15 of a pair are each separated in succession.

FIG. 1 shows how the poultry carcass 10 first passes the first separating device 13 as it is conveyed in the transport direction along the conveying line. The separating device 13 is configured to separate the wing or wing parts 15 from the right-hand side of the poultry carcass 10. The poultry carcass 10 then passes the second separating device 14. The separating device 14 is configured to separate the wing or wing parts 15 from the left-hand side of the poultry carcass 10. The illustrated order of separation of the wings or wing parts 15 is purely by way of example. Alternatively, the left-hand side of the poultry carcass 10 can also be processed first by way of the first separating device 13 and then the right-hand side of the poultry carcass 10 can be processed.

The poultry carcass 10 is advantageously—as is shown in the drawing—conveyed in the transport direction breast first. Alternatively, it is also possible to convey the poultry carcass with its back first.

The conveying device 12 preferably comprises carrier elements 16 for conveying and holding poultry carcasses 10. For reasons of clarity, only one of the carrier elements 16 is shown in the drawing. However, the conveying device 12 comprises a plurality of carrier elements 16. The carrier elements 16 are so configured and designed that the poultry carcasses 10 are mounted to be deflectable transversely to the transport direction 11, or substantially transversely to the transport direction 11.

Figure 4:
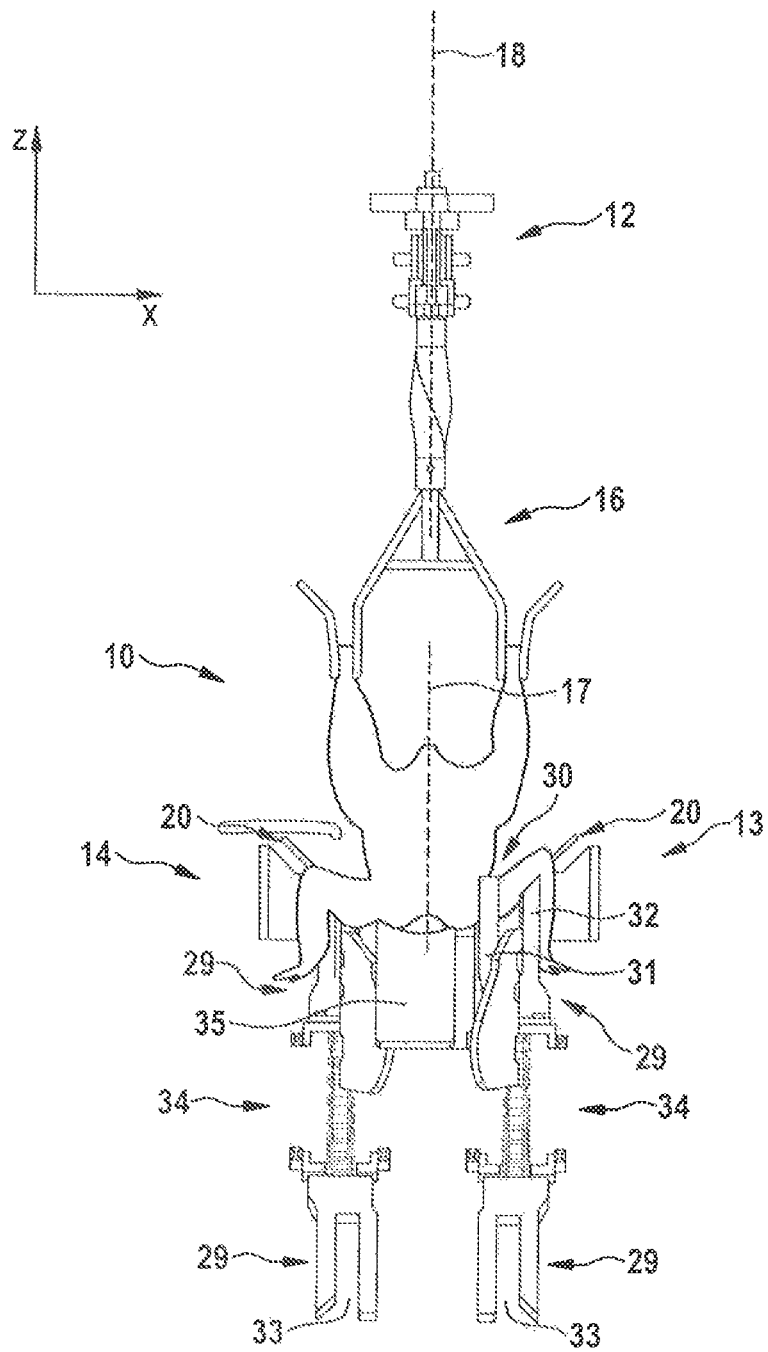
FIG. 4 is a front view of the wing cutting apparatus according to the invention, viewed in the transport direction.

The poultry carcass 10 is consequently mounted—as is shown in FIG. 4—with its centre axis 17 deflectable relative to a conveying axis 18 by way of the carrier elements 16 which are configured therefor. In particular, the poultry carcass 10 is thus mounted transversely or substantially transversely to the transport direction 11. In other words, the deflectable mounting is so configured that the poultry carcass 10 is configured with its centre axis 17 displaceable relative to the conveying axis 18. The centre axis 17 is a virtual axis which runs through the middle of the poultry carcass 10 and divides it into two halves.

The conveying axis 18 denotes an axis which runs vertically through the middle of one of the carrier elements 16 and which is perpendicular to the transport direction 11. The conveying axis 18 runs parallel to the Z-axis of the coordinate system shown in FIG. 4. The transport direction 11 is directed into the XZ plane. The deflectable mounting of the poultry carcass 10 is so configured that the poultry carcass is able to deflect with its centre axis 17 on the one hand transversely to the transport direction 11, that is to say at least with a subcomponent in a transverse direction. In the drawing, the transverse direction denotes the X direction. This leads to the above-described displacement between the centre axis 17 and the conveying axis 18. The conveying axis 18 can be displaced both translationally, that is to say by displacement in the X direction, and by a pivot movement. A combined pivot/displacement movement leads to an inclined position of the centre axis 17 relative to the conveying axis 18. The deflectable mounting optionally further permits rotation of the poultry carcass 10 about the Z-axis, that is to say about the conveying axis 18.

The conveying device 12 is preferably in the form of an overhead conveyor, for receiving the poultry carcass 10 suspended by its legs 19 by way of the carrier elements 16. Further preferably, the carrier elements 16 are in the form of shackles and configured to receive the ankle joints of the poultry carcasses 10.

The first separating device 13 and the second separating device 14 each comprise guiding devices 20. Each of the guiding devices 20 has a guiding gap 21 which extends parallel to the transport direction 11. The guiding devices 20 are configured to hold the wings or wing parts 15 in one of the guiding gaps 21 and guide them at least substantially parallel to the transport direction 11.

According to a further advantageous embodiment of the invention, the guiding gaps 21 taper in the transport direction 11. This has the effect that the wings or wing parts 15 are guided into an optimal cutting position. As a result of the tapered guiding gaps 21, the wings or wing parts 15 are aligned in the guiding gaps 21 in such a manner that the joint regions of the wings or wing parts in particular are positioned exactly in the guiding gaps 21.

Further preferably, a threading device 22 is arranged upstream of each of the guiding devices 20. The threading devices 22 are configured to thread the wing or wing part 15 into the guiding gap 21, or into the respective guiding gaps 21. For example, the threading device 22—as shown in the drawing—is in the form of a guide plate. Alternatively, however, the threading devices 22 can also be formed of one or more guide rods or the like.

According to a preferred embodiment, a cutting device 23 is arranged downstream of each of the guiding devices 20. By way of the cutting device 23, the wing or wing parts 15 are separated from the poultry carcass 10. The cutting device 23 are preferably arranged to be stationary. Further preferably, each of the cutting device 23 comprises two cutting edges 25 forming a cutting gap 24, which cutting edges are configured to separate the wing or wing part 15. The guiding devices 20, the cutting device 23 and the cutting edges 25 are in particular in one piece.

According to a further preferred embodiment, a cutting plane formed by the cutting edges 25 and the cutting gap 24 is arranged inclined relative to the horizontal. In other words, the cutting plane is arranged inclined relative to the X- or Z-axis. The cutting plane is particularly preferably arranged inclined by an angle which corresponds to the anatomical characteristics of the wing parts 15 of the poultry carcasses 10 that are to be separated. As is shown by way of example in the drawing, the cutting plane is aligned parallel or substantially parallel to the natural position of the upper wing part 26 of the poultry carcasses 10, so that the mid-wing part 27 is separated from the upper wing part 26 by way of the cutting device 23. By correspondingly specifying an angle of inclination of the cutting plane that is adapted to the anatomical characteristics, it is thus possible, for example, also to separate the wing tips 28 of the poultry carcasses 10 from the mid-wing part 27 and/or the upper wing part 26 from the poultry carcass 10.

A further preferred embodiment of the invention comprises a plurality of concurrent pushing elements 29. The cutting elements 29 are configured to run along in the transport direction 11 each in association with one of the carrier elements 16. The pushing elements 29 are further configured to come into engagement with the wing or wing parts 15. The pushing elements 29 are consequently designed to guide the wings or wing parts 15 that are to be separated.

The pushing elements 29 are further configured to come into engagement with the poultry carcass 10 in a shoulder region 30. The pushing elements 29 thus support both the poultry body 10 in its shoulder region 30 and the wing or wing parts 15 that are to be separated. To that end, the pushing elements 29 are preferably each in the form of a U-shaped profile and each have a shoulder region pushing piece 31 and a wing region pushing piece 32 with a pushing piece recess 33 located therebetween.

Further preferably, the pushing elements 29 are arranged transversely to the transport direction 11 in such a manner that at least one of the guiding devices 20 is arranged at least partially in the pushing piece recess 33. In other words, at least one of the guiding devices 20 is so arranged that the respective pushing element 29 surrounds it at least partially.

The pushing elements 29 are advantageously driven by device of at least one drive unit 34—indicated only schematically in the drawing—for moving the pushing elements 29 in the transport direction 11. The drive unit 34 is, for example, in the form of a motor-driven, revolving endless conveyor. However, the present invention is not limited solely to the type of drive for the pushing elements 29 which has been described above merely by way of example.

According to a preferred further development, the drive speed of the drive unit 34 is configured to be variably adjustable in such a manner that each of the pushing elements 29 is configured to be in advance of or to lag behind the associated carrier element 16 at least temporarily. In other words, the drive speed of the drive unit 34 is configured to be variable in such a manner that one of the pushing elements 29 is in advance of or lags behind the associated carrier element 16. This advance or lag is either static, that is to say configured to be constantly adjustable during the processing operation, or configured to be definable as a drive speed curve, so that the drive speed is varied during the processing operation.

A receiving element 35 is preferably arranged along the conveying line and is configured to support the poultry carcasses 10 on the neck side.

The invention claimed is:

1. A wing cutting apparatus for processing poultry carcasses, comprising
    a conveying device configured to convey a poultry carcass along a conveying line in transport direction;
    said conveying device comprising a carrier element for conveying and holding the poultry carcass and said carrier element being configured that the poultry carcass is mounted to be deflectable at least substantially transversely to the transport direction;
    first and second separating devices configured to separate wings or wing parts in pairs from one each of the poultry carcasses;
    said second separating device being offset from said first separating device along the conveying line in the transport direction in such a manner that the wings or wing parts in pairs separated in succession; and
    a plurality of concurrent pushing elements configured to run along in the transport direction,
    wherein at least one of the pushing elements is arranged to be in association with the carrier element and is configured to come into engagement with the wing or wing parts.

2. The wing cutting apparatus according to claim 1, wherein the carrier element comprises plural carrier elements.

3. The wing cutting apparatus according to claim 1, wherein the conveying device is an overhead conveyor for receiving the poultry carcass and the poultry is suspended by the legs via the carrier element.

4. The wing cutting apparatus according to claim 1, wherein the first separating device and the second separating device comprise guiding devices that each have a guiding gap extending parallel to the transport direction and are configured to guide the wings or wing parts at least substantially parallel to the transport direction.

5. The wing cutting apparatus according to claim 4, wherein each said guiding gap has a tapered section oriented in the transport direction.

6. The wing cutting apparatus according to claim 4, further comprising a threading device arranged upstream of each guiding device, said threading device being configured to thread the wing or wing part into the guiding gap.

7. The wing cutting apparatus according to claim 4, further comprising a cutting device arranged downstream of each guiding device, said cutting device being configured to separate the wing or wing part.

8. The wing cutting apparatus according to claim 7, wherein the cutting device is stationary.

9. The wing cutting apparatus according to claim 7, wherein each cutting device comprises two cutting edges forming a cutting gap, said two cutting edges being configured to separate the wing or wing part.

10. The wing cutting apparatus according to claim 9, wherein each cutting device is arranged so that a cutting plane formed by the two cutting edges is arranged inclined relative to a horizontal plane.

11. The wing cutting apparatus according to claim 1, wherein the pushing elements are configured to come into engagement with a shoulder region of the poultry carcass.

12. The wing cutting apparatus according to claim 1, wherein each of the pushing elements has a U-shaped profile and comprises a shoulder region pushing piece, a wing region pushing piece, and a pushing piece recess located therebetween.

13. The wing cutting apparatus according to claim 1, wherein the pushing elements are arranged transversely to the transport direction.

14. The wing cutting apparatus according to claim 1, wherein the pushing elements are driven via at least one drive unit.

15. The wing cutting apparatus according to claim 14, wherein the drive unit has a variably adjustable drive speed, whereby a position of the pushing elements can be changed at least temporarily to being in advance of or lagging behind a respective carrier element.

16. A method of processing poultry carcasses, comprising
    conveying with a conveying device a poultry carcass along a conveying line in transport direction;
    utilizing a carrier element for conveying and holding the poultry carcass and said carrier element being configured that the poultry carcass is mounted to be deflectable at least substantially transversely to the transport direction;
    separating wings or wings parts with first and second separating devices configured to separate wings or wing parts in pairs from one each of the poultry carcasses;
    arranging said second separating device so as to be offset from said first separating device along the conveying line in the transport direction in such a manner that the wings or wing parts in pairs separated in succession; and
    arranging a plurality of concurrent pushing elements so as to run along in the transport direction,
    wherein at least one of the pushing elements is arranged to be in association with the carrier element and is configured to come into engagement with the wing or wing parts.

17. The method of claim 16, wherein the carrier element comprises plural carrier elements.

18. The method of claim 16, wherein the conveying device is an overhead conveyor for receiving the poultry carcass and the poultry is suspended by the legs via the carrier element.

19. The method of claim 16, wherein the first separating device and the second separating device comprise guiding devices that each have a guiding gap extending parallel to the transport direction and are configured to guide the wings or wing parts at least substantially parallel to the transport direction.

20. The method of claim 19, wherein each said guiding gap has a tapered section oriented in the transport direction.

21. The method of claim 19, further comprising utilizing a threading device arranged upstream of each guiding device, said threading device being configured to thread the wing or wing part into the guiding gap.

22. The method of claim 19, further comprising utilizing a cutting device arranged downstream of each guiding device, said cutting device being configured to separate the wing or wing part.

23. The method of claim 22, wherein the cutting device is stationary.

24. The method of claim 22, wherein each cutting device comprises two cutting edges forming a cutting gap, said two cutting edges being configured to separate the wing or wing part.

25. The method of claim 24, wherein each cutting device is arranged so that a cutting plane formed by the two cutting edges is arranged inclined relative to a horizontal plane.

26. The method of claim 16, wherein the pushing elements are configured to come into engagement with a shoulder region of the poultry carcass.

27. The method of claim 16, wherein each of the pushing elements has a U-shaped profile and comprises a shoulder region pushing piece, a wing region pushing piece, and a pushing piece recess located therebetween.

28. The method of claim 16, wherein the pushing elements are arranged transversely to the transport direction.

29. The method of claim 16, wherein the pushing elements are driven via at least one drive unit.

30. The method of claim 29, wherein the drive unit has a variably adjustable drive speed, whereby a position of the pushing elements can be changed at least temporarily to being in advance of or lagging behind a respective carrier element.

* * * * *